(12) United States Patent
Kecalevic et al.

(10) Patent No.: US 12,172,508 B2
(45) Date of Patent: Dec. 24, 2024

(54) ENERGY STORAGE UNDERBODY FOR A MOTOR CAR BODY-IN-WHITE

(71) Applicant: Bayerische Motoren Werke Aktiengesellschaft, Munich (DE)

(72) Inventors: Nermin Kecalevic, Markt Schwaben (DE); Juergen Leschhorn, Geltendorf (DE); Roland Wanka, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 417 days.

(21) Appl. No.: 17/299,334

(22) PCT Filed: Nov. 15, 2019

(86) PCT No.: PCT/EP2019/081472
§ 371 (c)(1),
(2) Date: Jun. 3, 2021

(87) PCT Pub. No.: WO2020/120068
PCT Pub. Date: Jun. 18, 2020

(65) Prior Publication Data
US 2022/0016966 A1    Jan. 20, 2022

(30) Foreign Application Priority Data
Dec. 14, 2018   (DE) ............... 10 2018 132 258.5

(51) Int. Cl.
*B60K 1/04*       (2019.01)
*B62D 21/15*      (2006.01)
(Continued)

(52) U.S. Cl.
CPC ............. *B60K 1/04* (2013.01); *B62D 21/157* (2013.01); *B62D 25/025* (2013.01); *B62D 25/2036* (2013.01); *B60K 2001/0438* (2013.01)

(58) Field of Classification Search
CPC ............. B60K 1/04; B60K 2001/0438; B62D 21/157; B62D 25/025; B62D 25/2036
See application file for complete search history.

(56) References Cited

U.S. PATENT DOCUMENTS 10,328,978 B2 *  6/2019  Yang .................... B62D 21/157
10,603,999 B2 *  3/2020  Fukui .................... B62D 25/20
(Continued)

FOREIGN PATENT DOCUMENTS

CN       105144425 A     12/2015
CN       107031727 A      8/2017
(Continued)

OTHER PUBLICATIONS

International Search Report (PCT/ISA/210) issued in PCT Application No. PCT/EP2019/081472 dated Feb. 24, 2020 with English translation (six (6) pages).

(Continued)

*Primary Examiner* — Jason D Shanske
*Assistant Examiner* — Matthew James O'Neill
(74) *Attorney, Agent, or Firm* — Crowell & Moring LLP

(57) ABSTRACT

An energy storage underbody for a motor car body-in-white has a vehicle floor laterally delimited by side sills and reinforced by side members and/or cross members. An energy storage device is disposed on the underside of the vehicle floor. In order to obtain an energy storage device of particularly simple construction and a particularly economical, stiffened underbody, the energy storage underbody has at least one housing of the energy storage device, the housing being non-load bearing in terms of the body-in-white, and has at least one additional side member or cross member disposed on the topside of the vehicle floor to reinforce the underbody.

11 Claims, 3 Drawing Sheets

(51) Int. Cl.
    *B62D 25/02*    (2006.01)
    *B62D 25/20*    (2006.01)

(56) References Cited

U.S. PATENT DOCUMENTS

| | | | |
|---|---|---|---|
| 11,135,909 B2 * | 10/2021 | Volz | H01M 50/249 |
| 11,370,287 B2 * | 6/2022 | Tsuyuzaki | B62D 21/157 |
| 2013/0088044 A1 * | 4/2013 | Charbonneau | B62D 27/023 |
| | | | 296/187.12 |
| 2013/0229030 A1 | 9/2013 | Yamaguchi et al. | |
| 2013/0270864 A1 | 10/2013 | Young et al. | |
| 2017/0217498 A1 | 8/2017 | Akhlaque-e-Rasul et al. | |
| 2018/0236863 A1 | 8/2018 | Kawabe et al. | |
| 2019/0061507 A1 * | 2/2019 | Nitta | B60L 50/66 |
| 2021/0162849 A1 * | 6/2021 | Kerstan | B62D 21/15 |

FOREIGN PATENT DOCUMENTS

| | | |
|---|---|---|
| CN | 108454371 A | 8/2018 |
| CN | 108725597 A | 11/2018 |
| CN | 108791522 A | 11/2018 |
| DE | 10 2013 008 428 A1 | 12/2014 |
| EP | 2 468 609 A2 | 6/2012 |
| EP | 3 398 838 A1 | 11/2018 |
| JP | 2013-256265 A | 12/2013 |
| WO | WO 2018/216614 A1 | 11/2018 |

OTHER PUBLICATIONS

German-language Written Opinion (PCT/ISA/237) issued in PCT Application No. PCT/EP2019/081472 dated Feb. 24, 2020 (eight (8) pages).

German-language Office Action issued in German Application No. 10 2018 132 258.5 dated Nov. 29, 2019 (four (4) pages).

English Translation of Chinese-language Office Action issued in Chinese Application No. 201980075870.6 dated Dec. 8, 2023 (7 pages).

* cited by examiner

ENERGY STORAGE UNDERBODY FOR A MOTOR CAR BODY-IN-WHITE

BACKGROUND AND SUMMARY OF THE INVENTION

The invention relates to an energy storage underbody for a motor car body-in-white.

Such an energy storage underbody is already known from EP 2 468 609 A2, in which a vehicle floor of the underbody is delimited laterally by respective side rocker panels and stiffened by longitudinal members and/or crossmembers. The energy storage device is formed in this case by a housing which accommodates the respective battery cells or battery modules. This housing is stiffened by a frame-like construction of outer circumferentially encircling profile elements and a plurality of crossmembers such that the energy storage device can be fastened to the underside of the vehicle floor, in particular in the region of the side rocker panels, via respective bolted connections. In order to obtain here a force transmission between the energy storage device and the underbody that is as favorable as possible, the energy storage device is tailored in terms of its size and shape to the opening which is formed on the underside of the vehicle floor by the side rocker panels and the respective crossmembers. Accordingly, the housing of the energy storage device can be positioned and fastened, at least substantially in a form-fitting manner, between the respective side rocker panels. As a result, the energy storage device functions as an element of the underbody that is concomitantly load-bearing with respect to the body-in-white, which element is also used to absorb impact energy in the event of a side impact or has to perform certain crash functions.

In order for the energy storage device to be able to perform the functions described, it has to be of very complex construction, for example with a laterally encircling frame. This also means that damage to the energy storage device is very expensive since the energy storage device generally then has to be replaced. Furthermore, in order to provide this function, the energy storage device has to be of very stable and correspondingly heavy construction.

The object of the present invention is therefore to provide an energy storage underbody which has improved accident behavior in particular in the event of a side impact on the underbody.

This object is achieved according to the invention by an energy storage underbody having the features of the independent claim. Advantageous developments form the subject matter of the dependent claims.

The energy storage underbody according to the invention comprises a vehicle floor which is delimited laterally by respective side rocker panels and stiffened by crossmembers, and also an energy storage device which is arranged on the underside of the vehicle floor. In order to achieve particularly favorable accident behavior of the underbody, in particular in the event of a side impact on the motor car, there is provision according to the invention that an energy absorption device is provided within the respective side rocker panel, which device extends at least over a length region of the associated side rocker panel and at the level of the crossmembers. By virtue of these measures according to the invention, the energy storage device need have far less involvement in performing crash functions and can also be configured, for example, as a non-load-bearing component, as will be illustrated below. The invention thus makes it possible, in particular in the event of a side impact or a side collision, to realize a highly effective energy absorption device within the respective longitudinal member that provides the additional effect that the energy storage device can be considerably more simply configured in a weight-saving and cost-saving manner.

A particularly favorable development of the invention provides here that the energy storage underbody comprises at least one housing of the energy storage device that is non-load-bearing with respect to the body-in-white, and at least one additional longitudinal member or crossmember arranged on the upper side of the vehicle floor for stiffening the underbody. Accordingly, a separation between the receiving and sealing function of the energy storage device on the one hand and the stiffening function which, in the prior art to date, has also been performed by the housing of the energy storage device, is to be implemented by virtue of now providing, on the upper side of the vehicle floor, at least one further crossmember for stiffening the underbody. The at least one housing of the energy storage device can thus be configured without frame elements, profiles or the like that contribute to the stiffening of the underbody or of the motor car body-in-white and to taking up accident energy under the action of a corresponding accident-induced force. Rather, the function performed by the housing of the energy storage device is in particular that of tightly receiving the respective battery cells or battery modules.

Since the housing of the energy storage device is thus formed without concomitantly load-bearing elements of the underbody, this housing can be configured in a considerably more cost-effective manner. Moreover, the respective crossmembers which, as a result of the omission of respective members in the region of the energy storage device, are additionally arranged to the side of the vehicle floor make it possible for optimized load paths to be formed in the underbody or in the motor car body-in-white without the need here for corresponding load transfer points such as bolts or the like. There is thus not only provided a simpler solution which is more favorable in production terms, but moreover improved stiffness and stability of the underbody can also be achieved. In this case, the crash function is performed in the above-described manner by the energy absorption device within the respective side rocker panel.

In a further embodiment of the invention, the at least one housing of the energy storage device is arranged at a distance from the side rocker panels or from a front or rear crossmember of the underbody. Since, in particular, the housing of the energy storage device no longer contributes to stiffening the underbody, this housing can accordingly be arranged so as to be set back in relation to the side rocker panels or in relation to a front or rear crossmember, this in turn having the advantage that, under the action of an accident-induced force, for example in the event of a side impact, the housing of the energy storage device can be protected from damage in an improved manner, specifically, inter alia, also as a result of the energy absorption device according to the invention being arranged within the respective side rocker panel.

Furthermore, it has been shown to be advantageous if the underside of the at least one housing has arranged thereon a carrier element via which the at least one housing is held on the underside of the vehicle floor. The carrier element here can be in particular a carrier plate on which there is supported the at least one housing of the energy storage device that for its part receives a plurality of battery cells or battery modules. Such a carrier element makes it possible to achieve particularly simple mounting of the at least one housing of the energy storage device on the vehicle floor. Moreover, the carrier element is designed in a particularly advantageous manner in order to protect the at least one housing of the energy storage device from damage, for example upon collision with a bollard or the like.

A further advantageous embodiment of the invention provides for the carrier element to be arranged at a distance from the side rocker panels or from a front or rear crossmember of the underbody. This measure also allows damage to the energy storage device to be reduced in an improved manner, namely in particular in the event of a side impact. In this case, the crash function is performed in the above-described manner by the energy absorption device within the respective side rocker panel.

A further advantageous embodiment of the invention provides for a clearance to be provided between the energy storage device and the respective side rocker panel. This makes it possible for the side rocker panel, under the action of an accident-induced force, to be deformed to a certain extent before damage can occur to the energy storage device. In this case too, the crash function is performed by the energy absorption device within the respective side rocker panel.

In a further embodiment of the invention, a supporting element is provided between the energy storage device and the respective side rocker panel, at the level of which supporting element a further energy absorption device arranged below the first energy absorption device extends at least over a length region of the associated side rocker panel. This measure means that, with respect to the vertical extent of the side rocker panel in the vehicle vertical direction, it is possible, by means of the second energy absorption device, for a second load path to be created below the load path formed by the first, upper energy absorption device. This can moreover result in the accident forces having a force division which can be set by the position and configuration of the two energy absorption devices.

A further advantageous embodiment of the invention provides for the respective energy absorption device to be formed by a plurality of profile parts which follow one another in the vehicle transverse direction. Giving a suitable shape and wall thickness to the respective profile parts makes it possible here for the deformation behavior of the energy absorption device to be set in a particularly simple and accurate manner.

In this connection, the plurality of profile parts can be formed by a plurality of parts which are constructed separately from one another. As an alternative to this, the plurality of profile parts can be formed by a one-piece structural element, in particular a rolled profile, having the respective profile parts.

Finally, it has been shown to be advantageous if, to stiffen the underbody, the at least one crossmember arranged on the upper side of the vehicle floor is provided in addition to in any case present seat crossmembers and extends continuously between the side rocker panels or is attached thereto. This optimally results in a corresponding rectilinearly extending load path between the respective side rocker panels that is able to be highly loaded precisely in the event of a side impact or the like.

Further features of the invention will emerge from the claims, the figures and the description of the figures. The features and combinations of features stated above in the description, and also the features and combinations of features which are stated below in the description of the figures and/or are shown in the figures alone, may be used not only in the respectively specified combination, but also in other combinations or in isolation.

The invention will now be explained in more detail on the basis of a preferred exemplary embodiment and with reference to the drawings.

DETAILED DESCRIPTION OF THE DRAWINGS

Figure 1:
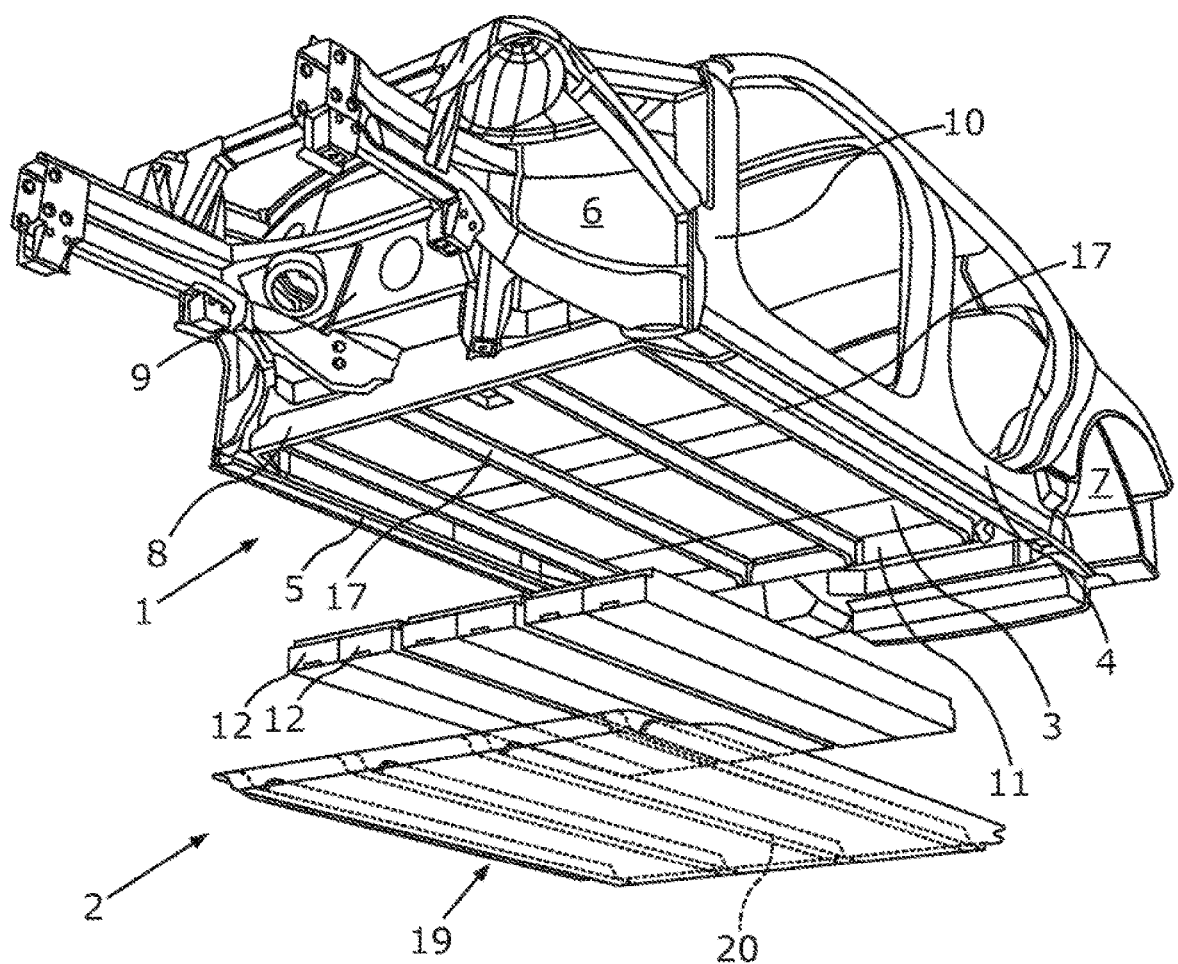
FIG. 1 shows a schematic bottom view of a motor car body having an energy storage underbody in which a vehicle floor is delimited laterally by respective side rocker panels and stiffened by longitudinal members and/or crossmembers, and in which an energy storage device is arranged on the underside of the vehicle floor that comprises a plurality of housings which extend in the vehicle longitudinal direction and are designed to be non-load-bearing with respect to the body-in-white.

FIG. 1 is a perspective bottom view showing a motor car body-in-white of a passenger motor car. Here, an energy storage underbody is formed by a body-in-white underbody 1, which will be explained in more detail below, and an energy storage device 2, which is illustrated here in exploded view beneath the underbody 1. The energy storage device 2 allows electrical energy to be able to supplied to a drive of the motor car, which is, for example, driven with a fully electrical drive or by means of a hybrid drive.

The underbody 1 is substantially formed by a, here mostly planar, vehicle floor 3, which is formed in particular from one or more shaped sheet-metal components. This vehicle floor 3 is delimited laterally by respective side rocker panels 4, 5 which extend substantially horizontally in the vehicle transverse direction between respective front and rear wheelhouses 6, 7 of each vehicle side. In the front region, the underbody 1 is delimited toward the front by a front crossmember 8 which—with respect to the vehicle longitudinal direction—extends at the level of a firewall 9 which partitions the vehicle cell off from the front-end structure of the motor car. Here, the crossmember 8 extends horizontally and in the vehicle transverse direction between respective front ends of the side rocker panels 4, 5 or lower ends of corresponding front door pillars 10. In a rear region, the underbody has a rear crossmember 11 which extends horizontally and in the vehicle transverse direction approximately—with respect to the vehicle longitudinal direction—at the level of the respective rear ends of the side rocker panels 4, 5. The vehicle floor 3, together with the side rocker panels 4, 5 and the crossmembers 8, 11, forms a downwardly open trough in which the energy storage device 2 is arranged below the vehicle floor 3 in a manner which will be descried in more detail below.

Here, the arrangement of the energy storage device 2 below the vehicle floor 3 will be explained below on the basis of FIGS. 2 and 3, which show the energy storage underbody in a perspective view or a sectional view from the front in each case along a section plane running in the vehicle transverse direction or in the vehicle vertical direction. It can be seen here that the energy storage device 2 comprises a plurality of, in the present case six, individual housings 12 which, in each case consisting of a cross-sectionally substantially U-shaped upper part 13 and a likewise substantially cross-sectionally U-shaped lower part 14, are connected to one another along a respective flanged connection 15. Here, the flanged connection 15 is formed by respective flanges of the upper part 13 and of the lower part 14 and extends in circumferentially enclosing closed fashion around the respective overall housing 12. As a result, battery cells or battery module 16 that are arranged within the respective housing 12 are received tightly within the respectively assigned housing 12.

Here, the plurality of housings 12 extend parallel to one another approximately horizontally and in the vehicle longitudinal direction. To the side of each of the housings 12, or between the individual housings 12, a respective holding profile 17 extends horizontally and in the vehicle longitudinal direction and has here, as viewed substantially in cross section, a hat profile and is fixed by means of respective flanges 18 to the underside of the vehicle floor 3, for example by way of a welded connection or some other kind of joining connection. The holding profiles 17 are here particularly also visible in FIG. 1 on the underside of the vehicle floor 3. They serve primarily to hold the energy storage device 2, which is formed by the plurality of housings 12. Accordingly, the holding profiles 17 are also arranged outside of the energy storage device 2.

Particularly in FIG. 1 there can be seen a carrier element 19 in the form of a carrier plate which, for example, can take the form of a shaped sheet-metal part, a plastics component or a cast metal component. In the present case, the carrier plate (carrier element 19) is designed to be substantially planar and has on its upper side respective clamping rails 20 which, in the respective central region between the individual housings 12, are configured to be double-T-shaped and, to the outside of the outermost housing 12, are configured in the manner of a box profile as viewed in cross section. These clamping rails 20 are, for example, fastened to the upper side or inner side of the carrier element 19 by way of a welded connection, some other joining connection or the like, and are aligned with the respectively corresponding holding profile 17, which for its part is fastened to the underside of the vehicle floor 3. Accordingly, the respective clamping rails 20 also extend at least substantially horizontally and in the vehicle longitudinal direction when the carrier element 19 is mounted on the underbody 1.

During the mounting operation, the carrier element 19 with the clamping rails 20 is equipped with the individual housings 12 and then fastened to the underside of the vehicle floor 3. Here, the housings 12 have their respective flanged connections 15 clamped between respective holding profile 17 and the respective clamping rail 20 by virtue of the carrier plate being fastened to the underside of the vehicle floor 3. This is primarily effected by corresponding bolted connections or other mechanical connection means being set between the carrier element 19 or the respective clamping rail 20 and the associated holding profile 17, with the result that the respective flanged connection 15 of the corresponding housing 12 is clamped between the respective holding profile 17 and the associated clamping rail 20. The carrier plate here serves not only for mounting and holding the respective housings 12, but also for protecting them. Particularly in the case of traveling over a bollard, the respective housings 12 are thus optimally protected from damage.

Figure 2:
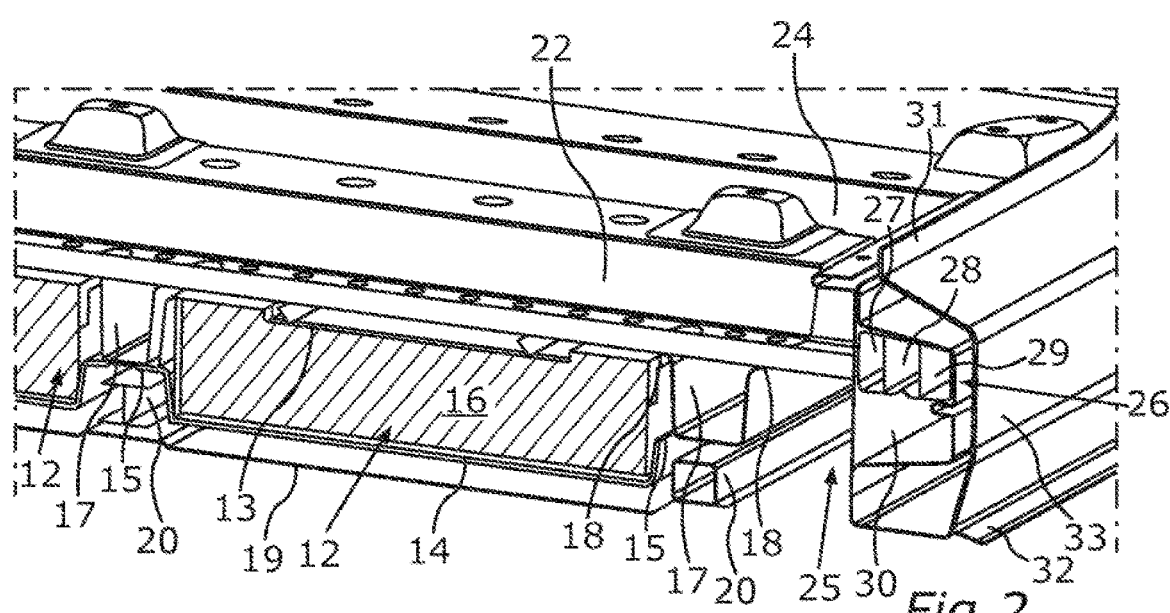
FIG. 2 shows a perspective sectional view through the energy storage underbody according to FIG. 1 along a section plane which extends in the vehicle vertical direction or in the vehicle transverse direction, wherein an energy absorption device is provided within the respective side rocker panel, which device extends at least over a length region of the associated side rocker panel and at the level of the crossmembers.
Figure 3:
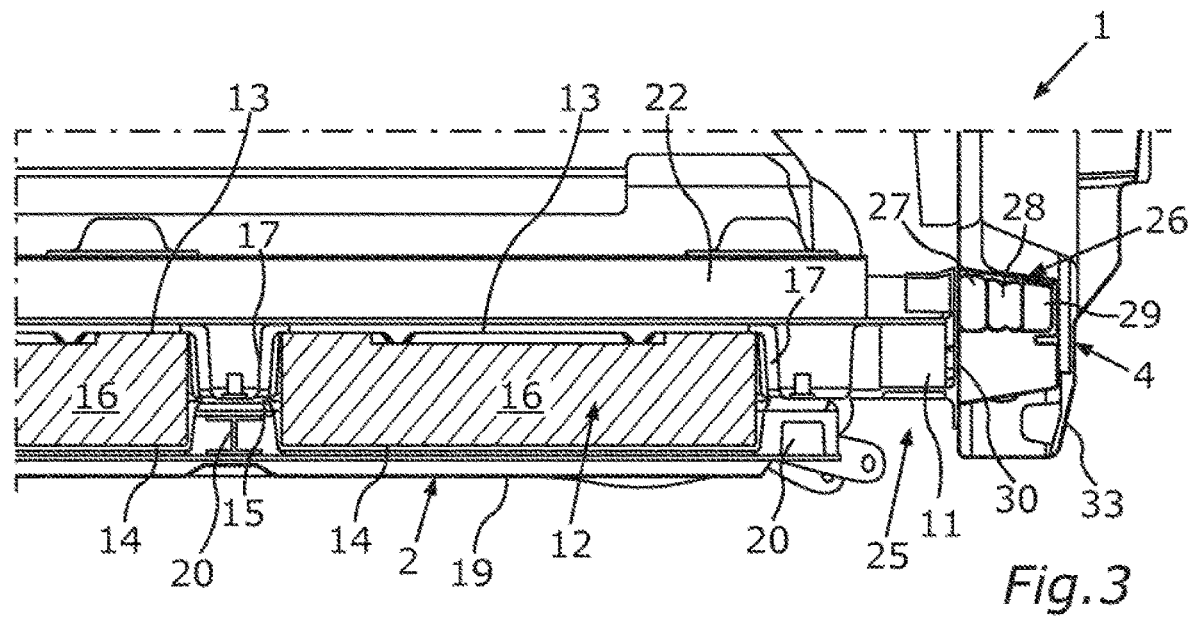
FIG. 3 shows a sectional view, in the form of a detail, of the energy storage underbody according to FIGS. 1 and 2 along a section plane extending in the vehicle transverse direction or vehicle vertical direction, wherein the energy absorption device which is arranged within the respective side rocker panel and extends at least over a length region of the associated side rocker panel and at the level of the crossmembers can be seen.

It can particularly also be seen from FIGS. 2 and 3 that both the respective housings 12 and the carrier plate (carrier element 19) terminate at a lateral distance from the respectively corresponding side rocker panel 4, 5. In other words, a clearance 25, which extends upwardly toward the underside of the vehicle floor 3, is provided between the energy storage device 2 and the respective side rocker panel 4, 5. There is therefore substantially no connection between the energy storage device 2 and the respective side rocker panel 4, 5 below the vehicle floor 3.

Moreover, it can be seen in particular from FIGS. 2 and 3 that the respective housing 12 with the respective upper parts 13 and lower parts 14 is designed to be substantially without a load-bearing structure. This means in particular that no bearers or bearer-like depressions are provided that would contribute in particular to stiffening the body in the vehicle transverse direction. It is also the case that, by contrast with the prior art to date, there is no frame provided which runs in an encircling manner around the energy storage device and via which the latter could be attached, for example, to the side rocker panels 4, 5. Toward the front or toward the rear in the vehicle longitudinal direction there can also be provided respective distances between the respective housings 12 and the corresponding crossmembers 8 and 11. This also applies to the carrier plate, which may, where appropriate, likewise terminate at a distance from said crossmembers 8, 11.

Figure 4:
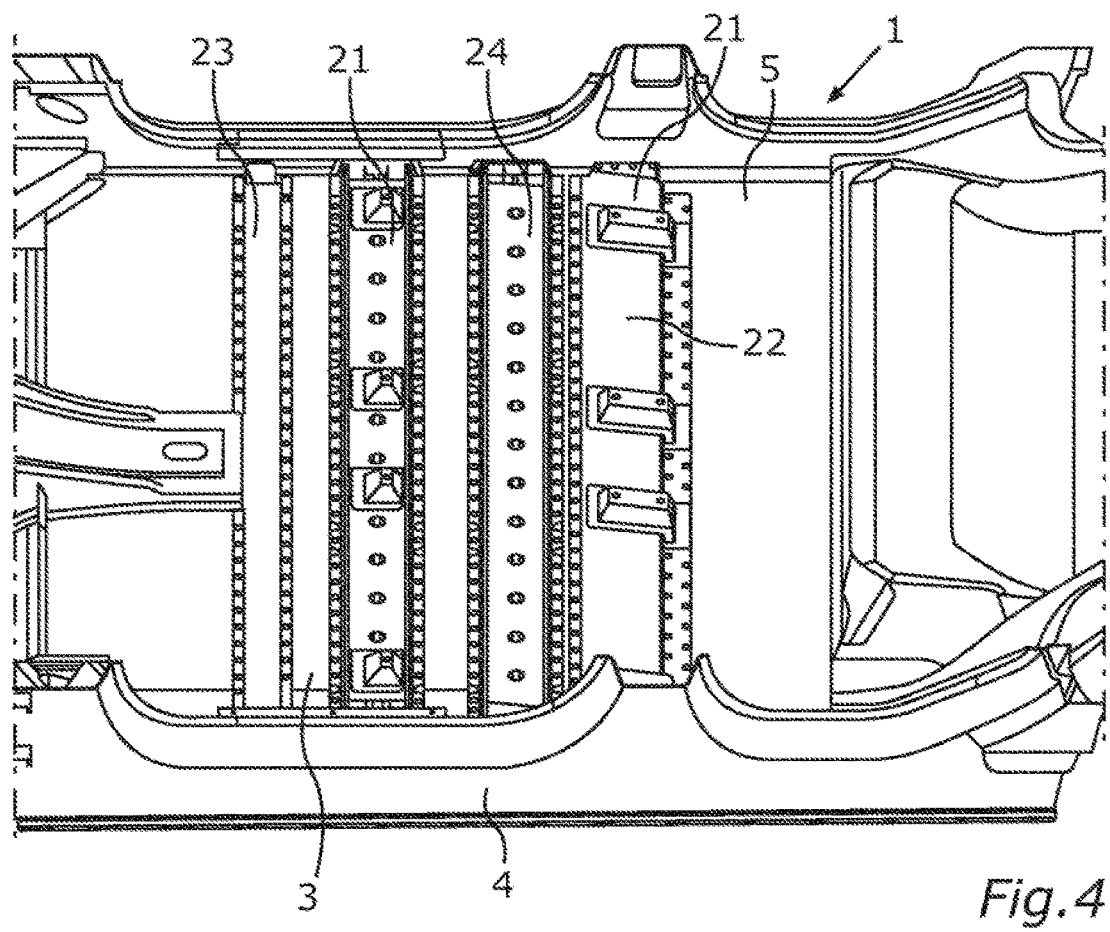
FIG. 4 shows a perspective view, in the form of a detail, of the vehicle floor of the underbody of the motor car body-in-white, with there being able to be seen, apart from the seat crossmembers, additional crossmembers for stiffening the underbody.

Since the energy storage device 2, and in particular its housing 12, does indeed have a sealing function for the battery module 16 arranged within it, but in particular no stiffening and load-bearing properties for the motor car body-in-white, there occurs additional stiffening of the underbody, as can be seen from FIG. 4 in a perspective and detail plan view. It can be seen in particular here that, in addition to respective seat crossmembers 21, 22, there are provided in the present case two further crossmembers 23, 24 which have up until now not been required on energy storage underbodies created in the conventional way according to the above-described prior art. Since namely, according to the invention, the respective housings 12 do not have a load-bearing and stiffening function for the motor car body-in-white or the underbody 1, this is accomplished by the crossmembers 23, 24 which extend on the upper side of the vehicle floor 3 or are fixed to the upper side thereof. The crossmembers 23, 24 extend here over the full width of the underbody between the two side rocker panels 4, 5, on which they are supported and also fastened. This results in two optimal load paths between the respective side rocker panels 4, 5 without—as in the prior art to date—a diversionary path having to be chosen by way of corresponding load transfer points in the form of bolts or the like at which the load was transferred from the underbody or the motor car body-in-white, in particular from the side rocker panels 4, 5, to the energy storage device 2 and its housing 12.

It is evident here that load paths are thus created which have been created in a simple manner by means of the respective crossmembers 23, 24 and can be welded in a simple manner and accordingly are attached not only in pointwise fashion. Moreover, a further main advantage of this design is that the described functional separation between the tightness of the respective housings 12 and the mechanical stiffening of the underbody 1 or of the motor car body-in-white is achieved. This makes it possible in particular for the respective housing 12 and the energy storage device 2 overall to be produced considerably more cost-effectively and, moreover, for an improved gripping function of the motor car body-in-white and of its underbody 1 to be achieved.

A further advantage is afforded by the fact that, between the side rocker panels 4, 5 and the energy storage device 2, in particular its housing 12, there is provided a gap or clearance 25 which is possible only by virtue of the fact that the respective housing 12 or the energy storage device 2 overall does not have to contribute to the stiffening of the underbody 1 and accordingly does not have to be necessarily fastened to the respective side rocker panel 4, 5. This particularly has the advantage that, in the event of a side impact of one of the side rocker panels 4, 5, there is a considerable distance to the energy storage device 2 or the respective housing 12, with the result that damage to the energy storage device 2 arises far later in the course of the accident scenario in the event of a side impact.

Since the energy storage device is formed from a plurality of individual housings 12 which, on account of their non-load-bearing function, do not have to be connected to one another, it is possible to dispense with an extremely complicated central attachment of the energy storage device 2 that has been required up until now. Rather, the individual housings 12 are optimally held in the underfloor region in particular by the combination of the carrier plate (carrier element 19) with the holding profiles 17 and the clamping rails 20.

As can be seen from the sectional views according to FIGS. 2 and 3, the respective side rocker panel 4, 5 has a respectively associated energy absorption device 26 arranged within it that extends at least over a length region in the vehicle longitudinal direction and horizontally within the associated side rocker panel 4, 5. Here, the energy absorption device 26—as viewed in the vehicle vertical direction—runs at least substantially at the level of the respective additional crossmembers 23, 24 or accordingly at the level of the seat crossmembers 21, 22 too, all of which are arranged above the vehicle floor. Here, in the present case, the energy absorption device 26 extends—with respect to the vehicle vertical direction—approximately over half the height of the corresponding seat crossmember 21 to 24 at the respective height thereof and downwardly beyond the vehicle floor 3 to a certain degree.

The energy absorption device 26 comprises in the present case a plurality of profile parts 27, 28, 29 which in the present case are formed by three chambers. The three profile parts 27, 28, 29 are accordingly to be understood as meaning the three chambers of the energy absorption device 26, which in the present case is a profile element which has been produced by roll-profiling a corresponding metal sheet. This means that the energy absorption device 26 is in the present case configured in one piece as a correspondingly roll-profiled shaped sheet-metal component as it is accordingly preferably formed in one piece. This one-piece nature allows a particularly simple structural element or rolled profile to be created.

It can additionally be seen from FIGS. 2 and 3 that this rolled profile, or the energy absorption device 26, is supported on the inner side of an inner rocker panel part 30 which for its part is connected to an outer rocker panel part 33 in the region of an upper flanged connection 31 and in the region of a lower, outer flanged connection 32. Where appropriate, the inner rocker panel part 30 can also be of multipart configuration.

In the present case, a cross-sectionally approximately M-shaped reinforcing part 34 is arranged within the cavity of the side rocker panel 4, 5 that is formed by the inner rocker panel part 30 and by the outer rocker panel part 33, wherein the rolled profile of the energy absorption device 26 is received within a chamber of this M-shaped reinforcing part 34. This means in the present case that the energy absorption device 26 does not extend outwardly in the vehicle transverse direction up to the outer rocker panel part 33, but rather is delimited on the outside by the reinforcing part 34. In other words, a clearance is provided between the reinforcing part 34 and the outer rocker panel part 33.

The rolled profile of the energy absorption device 26 can, for example, have a different material thickness over the extent thereof in order thereby to set the deformation behavior of the energy absorption device 26. The characteristics of the rolled profile, or of the energy absorption device 26, can also be set through suitable shaping or material selection.

If, for example in the event of a side impact or side collision, a corresponding obstacle, such as for example a pole, should now strike the underbody 1, the energy absorption device 26 ensures that impact energy is correspondingly absorbed, as has up until now occurred, for example, by means of a frame of a housing of the energy storage device. However, since in the present case the energy storage device 2 is designed to be non-load-bearing, or is arranged at a distance from the corresponding side rocker panels 4, 5 and accordingly forms the clearance 25, the energy absorption device 26 performs the function that has up until now been carried out by the frame of the housing of the energy storage device 2. The advantage resulting therefrom lies particularly in the fact that, in the event of a side impact, first of all the energy absorption device 26 is damaged and not for instance the energy storage device 2. In this regard, damage to the side rocker panel 4, 5 or to the energy absorption device 26 can be far better and more cost-effectively rectified than damage to the frame of the housing of the energy storage device, as was usually the case up until now. Moreover, as already described above, the energy storage device 2 can thus be designed to be non-load-bearing.

Figure 5:
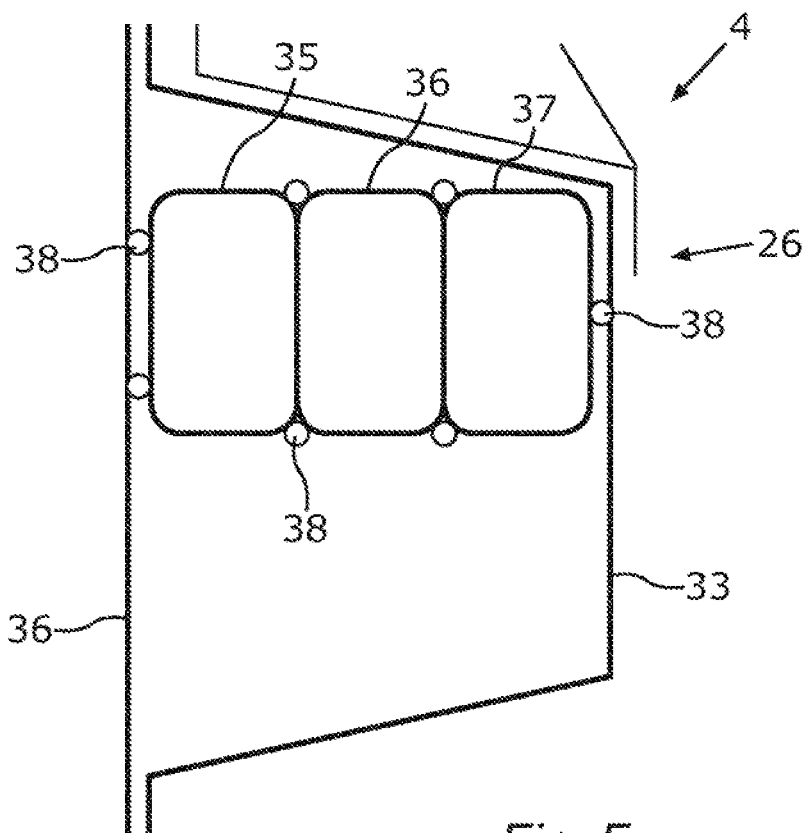
FIG. 5 shows a schematic sectional view through an alternatively constructed energy absorption device within the respective side rocker panel of the energy storage underbody.

FIG. 5 is a schematic sectional view illustrating an alternatively formed energy absorption device 26 within the respective side rocker panel 4, 5. This energy absorption device 26 is in the present case formed by three separate profile parts 35, 36, 37 in the form of respective, approximately cross-sectionally rectangular rolled steel profiles which are connected to one another via respective laser seams 38. Moreover, the assembly of the profile parts 35, 36, 37 is also fastened, via corresponding laser seams 38, to the inner rocker panel part 30 and outer rocker panel part 33. A particular feature that can be seen in the present case is that the respective rolled steel profiles have respective smaller wall thicknesses from inside to outside so as thereby to set the deformation behavior. It is of course also possible, for example, for other materials to be used.

Figure 6:
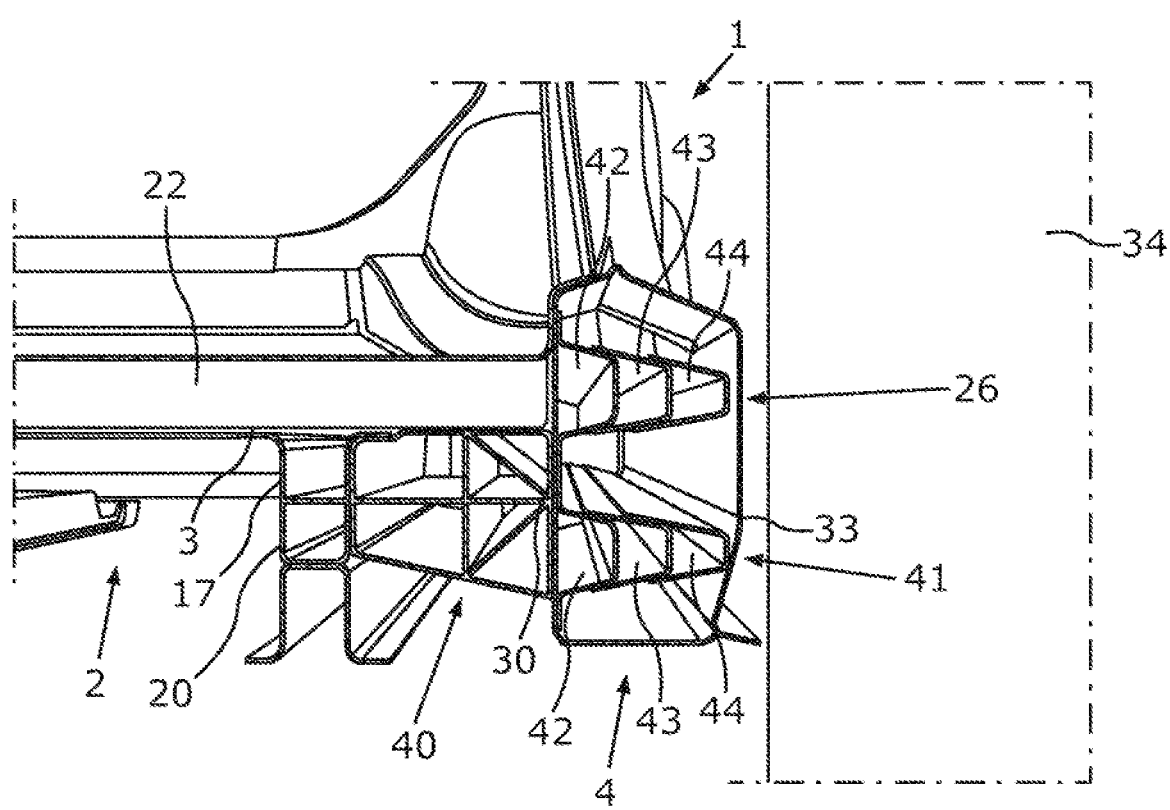
FIG. 6 shows a sectional view, in the form of a detail, of the energy storage underbody in an alternative embodiment to that according to FIGS. 1 to 3 along a section plane extending in the vehicle transverse direction or vehicle vertical direction.

Finally, FIG. 6 shows in a sectional view, in the form of a detail, the energy storage underbody in an alternative embodiment to that according to FIGS. 1 to 3 along a section plane running in the vehicle transverse direction or vehicle vertical direction. There can additionally be seen a pole 39 which is intended to illustrate a side impact or pole collision.

It can be seen from FIG. 6, by contrast with the embodiment according to FIGS. 1 to 3, that a supporting element 40, which extends downwardly starting from the vehicle floor 3, is provided in the clearance 25 between the energy storage device, more precisely between the respectively outermost holding profile 17 or the associated clamping rail 20, and the inner rocker panel part 30. Here, this supporting element 40 runs, in the vehicle longitudinal direction, approximately horizontally over a corresponding length region of the associated side rocker panel 4, 5. In the present case, the supporting element 40 is formed, for example, by an extruded profile having corresponding ribs. Of course, sheet-metal constructions or the like would also be conceivable here.

The supporting element 40 affords a further support possibility for a further energy absorption device 41, which runs at the level of the supporting element 40 in the vehicle longitudinal direction and approximately horizontally over a corresponding length region of the associated side rocker panel 4, 5 within the cavity thereof. In other words, the second energy absorption device 41, just like the first energy absorption device 26 arranged above it, runs within the cavity formed by the side rocker panel 4, 5.

By virtue of the two energy absorption devices 26, 41, there are thus formed two load paths, which are arranged one above the other in the vehicle vertical direction, in order to provide two load paths, or deformation planes, in the event of a collision with the pole 39 or some other obstacle. Here, respective force components can arise between the upper and lower load path or between the upper and lower energy absorption device 26, 41 as a result of suitable positioning, configuration and material selection.

Finally, it can be seen from FIG. 6 that in the present case each of the energy absorption devices 26, 41 is formed from a plurality of cross-sectionally hat profile-like profile parts 42, 43, 44 which can slide into one another in the event of a side impact.

LIST OF REFERENCE SIGNS

1 Underbody
2 Energy storage device
3 Vehicle floor
4 Side rocker panel
5 Side rocker panel
6 Wheelhouse
7 Wheelhouse
8 Crossmember
9 Firewall
10 Door pillar
11 Crossmember
12 Housing
13 Upper part
14 Lower part
15 Flanged connection
16 Battery module
17 Holding profile
18 Flange
19 Carrier element
20 Clamping rail
21 Seat crossmember
22 Seat crossmember
23 Crossmember
24 Crossmember
25 Clearance
26 Energy absorption device
27 Profile part
28 Profile part
29 Profile part
30 Inner rocker panel part
31 Flanged connection
32 Flanged connection
33 Outer rocker panel part
34 Reinforcing part
35 Profile part
36 Profile part
37 Profile part
38 Laser seam
39 Pole
40 Supporting element
41 Energy absorption device
42 Profile part
43 Profile part
44 Profile part

What is claimed is:

1. An energy storage underbody for a motor car body-in-white, comprising:
    a vehicle floor delimited laterally by respective side rocker panels and stiffened by crossmembers;
    an energy storage device arranged on an underside of the vehicle floor, the energy storage device having at least one housing that is non-load-bearing with respect to the body-in-white;
    an energy absorption device provided within an interior cavity of each respective side rocker panel, wherein
    the energy absorption device extends at least over a length region of an associated side rocker panel and at a level of the crossmembers, and
    the at least one housing of the energy storage device is arranged at a distance from the side rocker panels of the underbody.

2. The energy storage underbody according to claim 1, further comprising:
    at least one additional longitudinal member or crossmember arranged on an upper side of the vehicle floor for stiffening the underbody.

3. The energy storage underbody according to claim 2, wherein
    the at least one housing of the energy storage device is arranged at a distance from a front or rear crossmember of the underbody.

4. The energy storage underbody according to claim 2, wherein
    the at least one housing has arranged on an underside thereof a carrier element via which the at least one housing is held on the underside of the vehicle floor,
    the carrier element is arranged so as to terminate at a lateral distance from the side rocker panels or from a front or rear crossmember of the underbody.

5. The energy storage underbody according to claim 1, wherein
    a clearance is provided between the energy storage device and the respective side rocker panel.

6. The energy storage underbody according to claim 1, further comprising:

a supporting element provided between the energy storage device and the respective side rocker panel, at the level of which supporting element a further energy absorption device arranged below the first energy absorption device extends at least over a length region of the associated side rocker panel.

7. The energy storage underbody according to claim 1, wherein the energy absorption device is formed by a plurality of profile parts which follow one another in a vehicle transverse direction.

8. The energy storage underbody according to claim 7, wherein the plurality of profile parts are formed by a plurality of parts constructed separately from one another.

9. The energy storage underbody according to claim 7, wherein the plurality of profile parts are formed by a one-piece structural element having the respective profile parts.

10. The energy storage underbody according to claim 2, wherein to stiffen the underbody, the at least one additional crossmember arranged on the upper side of the vehicle floor is separate from any seat crossmembers, and extends continuously between the side rocker panels.

11. The energy storage underbody according to claim 1, wherein the energy storage device is fastened in a region of the side rocker panels only to the underside of the vehicle floor.

\* \* \* \* \*